United States Patent
Jomori et al.

(10) Patent No.: US 9,476,897 B2
(45) Date of Patent: Oct. 25, 2016

(54) PHYSICAL QUANTITY SENSOR

(71) Applicant: DENSO CORPORATION, Kariya, Aichi-pref. (JP)

(72) Inventors: Tomoya Jomori, Kariya (JP); Yoichi Mochida, Nagaokakyo (JP)

(73) Assignee: DENSO CORPORATION, Kariya (JP)

( * ) Notice: Subject to any disclaimer, the term of this patent is extended or adjusted under 35 U.S.C. 154(b) by 60 days.

(21) Appl. No.: 14/401,627

(22) PCT Filed: May 28, 2013

(86) PCT No.: PCT/JP2013/003356
§ 371 (c)(1),
(2) Date: Nov. 17, 2014

(87) PCT Pub. No.: WO2013/179647
PCT Pub. Date: Dec. 5, 2013

(65) Prior Publication Data
US 2015/0168437 A1 Jun. 18, 2015

(30) Foreign Application Priority Data

May 29, 2012 (JP) ................................. 2012-122120
Feb. 14, 2013 (JP) ................................. 2013-026699

(51) Int. Cl.
*G01P 15/00* (2006.01)
*G01P 1/00* (2006.01)
(Continued)

(52) U.S. Cl.
CPC ........... *G01P 1/003* (2013.01); *G01C 19/5747* (2013.01); *G01P 1/026* (2013.01); *G01P 3/14* (2013.01); *G01P 3/44* (2013.01)

(58) Field of Classification Search
CPC .......... G01P 1/003; G01P 1/026; G01P 3/14; G01P 3/44
See application file for complete search history.

(56) References Cited

U.S. PATENT DOCUMENTS 5,728,936 A * 3/1998 Lutz .................... G01C 19/5747
73/504.12
5,869,760 A * 2/1999 Geen .................. G01C 19/5712
73/504.04

(Continued)

FOREIGN PATENT DOCUMENTS

| JP | 2002-257551 A | 9/2002 |
| JP | 2007-80107 A | 3/2007 |
| JP | 2007-85822 A | 4/2007 |

OTHER PUBLICATIONS

Written Opinion of the International Searching Authority dated Jul. 2, 2013 for the corresponding international application No. PCT/JP2013/003356 (and English translation).

*Primary Examiner* — Laura Martin
*Assistant Examiner* — Samir M Shah
(74) *Attorney, Agent, or Firm* — Posz Law Group, PLC

(57) ABSTRACT

A physical quantity sensor has a resonance frequency f1 in same-phase mode and a resonance frequency f3 in same-phase absorptive mode greater than the resonance frequency f1. An absolute value Δf3 is a difference between the resonance frequency f3 in the same-phase absorptive mode and a value that is the product of the resonance frequency f1 in the same-phase mode multiplied by n; an avoidance difference D indicates a degree of deviation of the absolute value Δf3 from the resonance frequency f1 in the same-phase mode. A relation (Δf3>n·f1·D) is satisfied, and, simultaneously, the avoidance difference D is provided to be greater than 0%. This can avoid the vibrational excitation by resonance interference from becoming the maximum displacement.

3 Claims, 8 Drawing Sheets

(51) Int. Cl.
*G01C 19/5747* (2012.01)
*G01P 1/02* (2006.01)
*G01P 3/14* (2006.01)
*G01P 3/44* (2006.01)

(56) References Cited

U.S. PATENT DOCUMENTS

| | | | | |
|---|---|---|---|---|
| 6,122,961 A * | 9/2000 | Geen | ................ | G01C 19/5719 73/504.12 |
| 6,742,390 B2 * | 6/2004 | Mochida | ........... | G01C 19/5719 73/504.04 |
| 6,848,304 B2 * | 2/2005 | Geen | ................ | G01C 19/5719 73/504.04 |
| 7,340,954 B2 * | 3/2008 | Handrich | ........... | G01C 19/5726 73/504.04 |
| 7,421,897 B2 * | 9/2008 | Geen | ................... | G01C 19/574 73/504.12 |
| 7,461,552 B2 * | 12/2008 | Acar | .................... | G01P 15/125 73/504.04 |
| 7,513,155 B2 * | 4/2009 | Jeong | ................ | G01C 19/5747 73/504.02 |
| 8,733,172 B2 * | 5/2014 | Coronato | ........... | G01C 19/5712 73/504.12 |
| 8,813,565 B2 * | 8/2014 | Caminada | ............ | G01C 19/56 73/504.12 |
| 8,833,164 B2 * | 9/2014 | Coronato | ........... | G01C 19/5712 73/504.14 |
| 8,844,357 B2 * | 9/2014 | Scheben | ............ | G01C 19/5747 73/504.12 |
| 8,943,890 B2 * | 2/2015 | Jeong | ................ | G01C 19/5719 73/504.04 |
| 8,950,257 B2 * | 2/2015 | Cazzaniga | ......... | G01C 19/5747 73/504.12 |
| 9,052,194 B2 * | 6/2015 | Seeger | ............... | G01C 19/5719 |
| 9,068,834 B2 * | 6/2015 | Gunthner | .............. | G01C 19/574 |
| 9,097,524 B2 * | 8/2015 | Seeger | ............... | G01C 19/5755 |
| RE45,792 E * | 11/2015 | Coronato | ........... | G01C 19/5712 |
| RE45,855 E * | 1/2016 | Coronato | ........... | G01C 19/5712 |
| 9,278,847 B2 * | 3/2016 | Cazzaniga | ............ | B81B 3/0018 |
| 2002/0035873 A1 | 3/2002 | Sakai et al. | | |
| 2003/0154788 A1 * | 8/2003 | Willig | ................ | G01C 19/5747 73/504.02 |
| 2004/0206176 A1 * | 10/2004 | Willig | ................ | G01C 19/5747 73/504.12 |
| 2004/0211257 A1 * | 10/2004 | Geen | ................ | G01C 19/574 73/504.04 |
| 2005/0050954 A1 * | 3/2005 | Chaumet | ............ | G01C 19/5747 73/504.12 |
| 2007/0234803 A1 * | 10/2007 | Gomez | ............. | G01C 19/5755 73/504.12 |
| 2010/0116050 A1 * | 5/2010 | Wolfram | ............... | G01C 19/574 73/504.12 |
| 2011/0036167 A1 | 2/2011 | Ohkoshi et al. | | |

* cited by examiner

PHYSICAL QUANTITY SENSOR

CROSS REFERENCE TO RELATED APPLICATION

The present disclosure is a U.S. national stage application of PCT/JP2013/003356 filed on May 28, 2013 and is based on Japanese Patent Application No. 2012-122120 filed on May 29, 2012, and Japanese Patent Application No. 2013-26699 filed on Feb. 14, 2013, the contents of which are incorporated herein by reference.

TECHNICAL FIELD

The present disclosure relates to a physical quantity sensor under a spring mass system having two or more degrees of freedom where at least two weights are supported by respective springs and are able to be displaced.

BACKGROUND ART

There is conventionally known a physical quantity sensor under a spring mass system. The physical quantity sensor is to detect a physical quantity applied to a weight supported by a spring based on a displacement of the weight resulting from the application of the physical quantity. For instance, Patent Literature 1 proposes, as a physical quantity sensor under a spring mass system, a sensor that includes a fixed electrode supported by a substrate and a movable electrode provided in a weight supported by the substrate via a spring (beam), both electrodes being arranged to be opposed to each other with a desired interval. Application of a physical quantity displaces the weight and movable electrode which are supported by the beam, changing the interval between the fixed electrode and the movable electrode and changing a capacitance generated between both the electrodes. The change of the capacitance permits the detection of the physical quantity.

In the above physical quantity sensor under a spring mass system, an application of an excessive impact from outside causes sometimes a displacement greater than that expected from the spring constant, the mass of the weight, the external acceleration. As a result, the weight may be displaced across a movable range of the weight previously designed; thereby, for example, the movable electrode may contact the fixed electrode to cause an erroneous output from the sensor.

This erroneous output may be solved by countermeasures such as a vibration proof member provided to surround the physical quantity sensor to prevent an impact from reaching the physical quantity sensor, or an increase of the interval between the movable electrode and the fixed electrode. However, in the former, the vibration proof member may increase the size of the apparatus or the cost of the apparatus; in the latter, sensor sensitivity may fall.

PRIOR ART LITERATURES

Patent Literature

Patent Literature 1: JP 2002-40044 A (corresponding to US 2002/0035873A1)

SUMMARY OF INVENTION

In consideration of the above point, it is an object of the present disclosure to provide a physical quantity sensor that improves shock resistant performance without using a vibration proof member and without deteriorating sensor sensitivity.

According to a first example of the present disclosure, a physical quantity sensor is provided to include: a substrate; a drive weight supported by the substrate via a first spring; a detection weight supported by the drive weight via a second spring, the detection weight including a detection movable electrode; and a detection fixed portion including a detection fixed electrode that is arranged to be opposed to the detection movable electrode. When a physical quantity is applied while the drive weight is driven and vibrated, the detection movable electrode and the detection weight are displaced to change an interval between the detection movable electrode and the detection fixed electrode. The physical quantity is detected based on the changed interval. Herein, $f1$ is defined as a resonance frequency in same-phase mode where the drive weight moves following the application of the physical quantity in a direction identical to a direction in which the detection weight moves; $f3$ is defined as a resonance frequency in same-phase absorptive mode where the drive weight moves following the application of the physical quantity in a direction opposite to a direction in which the detection weight moves; $n$ is defined as an integer that is equal to or greater than one. The resonance frequency $f3$ in the same-phase absorptive mode is greater than the resonance frequency $f1$ in the same-phase mode. $\Delta f3$ is defined as an absolute value that is a difference between the resonance frequency $f3$ in the same-phase absorptive mode and a value that is the product of the resonance frequency $f1$ in the same-phase mode multiplied by $n$; $D$ is defined as an avoidance difference that indicates a degree of deviation of the absolute value $\Delta f3$ from the resonance frequency $f1$ in the same-phase mode. A relation $(\Delta f3 > n \cdot f1 \cdot D)$ is satisfied and, simultaneously, the avoidance difference $D$ is provided to be greater than 0%.

Thus, while a relation $(\Delta f3 > n \cdot f1 \cdot D)$, the avoidance difference $D$ is provided to be greater than 0% at least. This can avoid the vibrational excitation by resonance interference from exhibiting the maximum displacement.

According to a second example of the present disclosure, the physical quantity sensor may be provided to have the avoidance difference $D$ being greater than 5%. This enables the reduction of the amplification factor $A$ irrespective of $Q$ factor, enabling an improvement in robustness.

According to a third example of the present disclosure, the physical quantity sensor may be provided to have the avoidance difference $D$ being greater than 10%. This permits the amplification factor $A$ to reduce to a single-digit value, restricting the vibrational excitation by resonance interference to a sufficiently reduced state equivalent to that of the vibrational excitation by dissonance or the vibrational excitation by resonance.

The resonance frequency $f1$ in the same-phase mode and the resonance frequency $f3$ in the same-phase absorptive mode are designed to satisfy the above relation; this can reduce the vibrational excitation by resonance interference. This enables an improvement in a shock resistant performance without using a vibration proof member, and without causing a decline in the sensor sensitivity.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

The following will explain embodiments of the present disclosure with reference to drawings. In the embodiments mentioned below, explanations are made by assigning mutually identical or equivalent members with an identical reference sign.

The following will describe an embodiment of the present disclosure. The present embodiment will explain a physical quantity sensor by exemplifying an oscillatory type angular velocity sensor (gyro sensor).

The oscillatory type angular velocity sensor explained in the present embodiment is a sensor for detecting an angular velocity as a physical quantity; for example, it is used for detecting a rotational-angle velocity about a center line parallel with an up-and-down direction of a vehicle. In addition, the oscillatory type angular velocity sensor may be also applied to other than vehicles.

Figure 1:
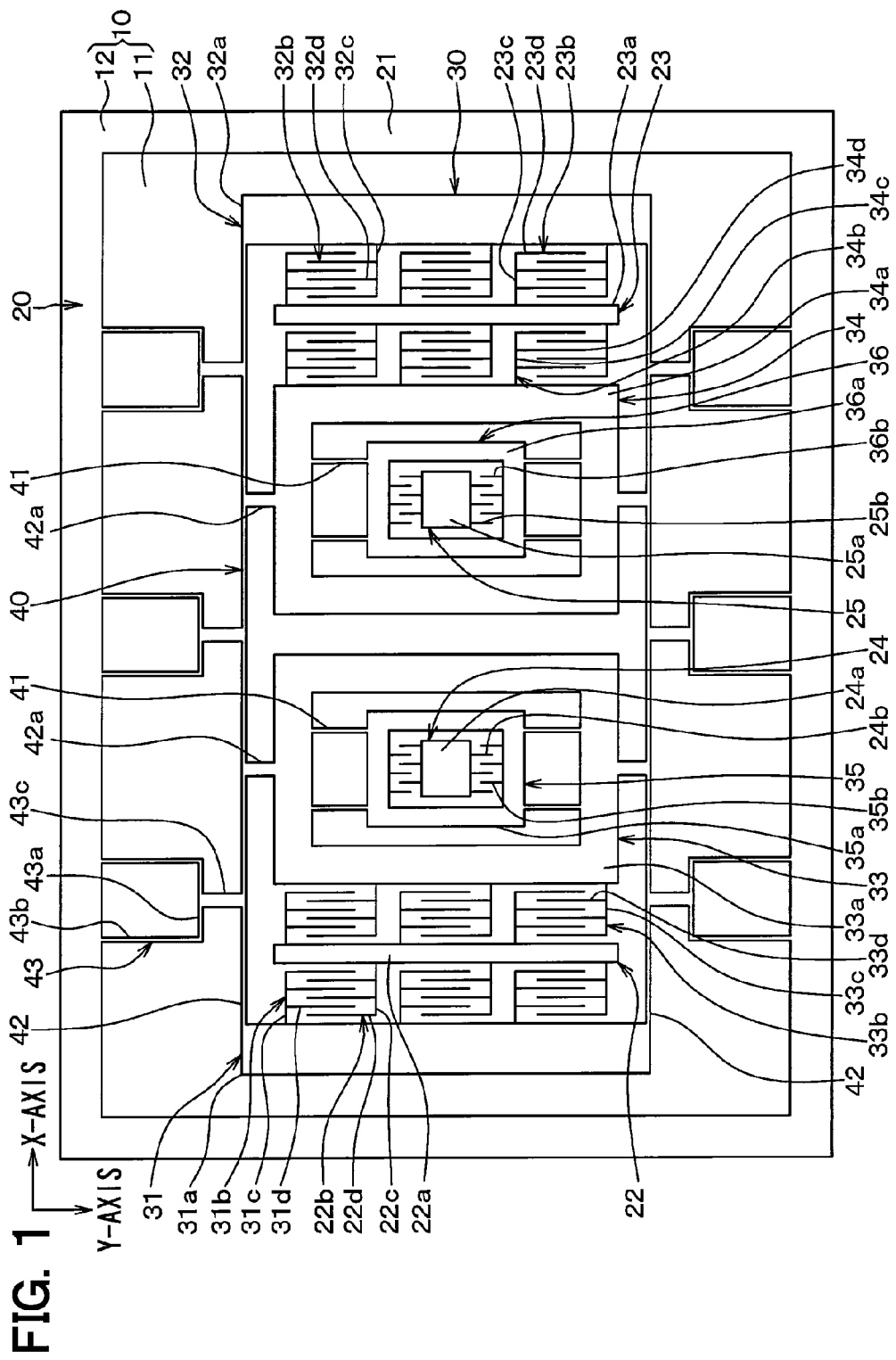
FIG. 1 is a schematic plan-view diagram of an oscillatory type angular velocity sensor according to an embodiment of the present disclosure.

FIG. 1 is a schematic plan-view diagram of an oscillatory type angular velocity sensor according to an embodiment of the present disclosure. The oscillatory type angular velocity sensor is mounted in a vehicle such that a direction normal to the drawing in FIG. 1 accords with the up-and-down direction of the vehicle. The oscillatory type angular velocity sensor is formed on one surface of a plate-shaped substrate 10. The substrate 10 uses an SOI (Silicon on insulator) substrate where an embedded oxide film serving as a sacrifice layer (unshown) is sandwiched between a support substrate 11 and a semiconductor layer 12. The above sensor structure is achieved by eliminating partially an embedded oxide film after etching the semiconductor layer 12 into the patterns of the sensor structural members, and then causing part of the sensor structural members to be in a released state.

In the explanation below, an axis along a left-and-right direction that is one of two directions parallel with the surface of the semiconductor layer 12 is defined as an x axis; a direction along the x axis is defined as an x-axis direction. In addition, an axis along the up-and-down direction on the drawing orthogonal to the x axis is defined as a y axis; a direction along the y axis is defined as a y-axis direction. Furthermore, a direction orthogonal to one surface of the semiconductor layer 12 is defined as a z axis; a direction along the z axis is defined as a z-axis direction.

The semiconductor layer 12 is patterned into a fixed portion 20, a movable portion 30, and a beam portion 40. In at least part of a rear face of the fixed portion 20, an embedded oxide film is left; the fixed portion 20 is not released from the support substrate 11 and is fixed to the support substrate 11 via the embedded oxide film. The movable portion 30 and the beam portion 40 compose an oscillator in the oscillatory type angular velocity sensor. In the rear face of the movable portion 30, any embedded oxide film is eliminated; the movable portion 30 is released from the support substrate 11. While supporting the movable portion 30, the beam portion 40 displaces the movable portion 30 in the x-axis direction and the y-axis direction in order to detect an angular velocity. The following will explain detailed structures of the fixed portion 20, the movable portion 30, and the beam portion 40.

The fixed portion 20 includes a support fixed portion 21 for supporting the movable portion 30; drive fixed portions 22 and 23 to which drive voltage is applied; detection fixed portions 24 and 25 used for angular velocity detection.

The support fixed portion 21 is arranged so as to surround the periphery of the sensor structural members such as the movable portion 30 and other portions of the fixed portions (the drive fixed portions 22 and 23 and the detection fixed portions 24 and 25); the support fixed portion 21 supports the movable portion 30 in the inner wall of the support fixed portion 21. The present embodiment explains an example where the support fixed portion 21 surrounds all the periphery of the sensor structural members. However, the support fixed portion 21 may be arranged to in part of the periphery.

The drive fixed portions 22 and 23 include the drive fixed portion 22 arranged between the outer drive weight 31 and the inner drive weight 33, and the drive fixed portion 23 arranged between the outer drive weight 32 and the inner drive weight 34. The drive fixed portions 22 and 23 include base portions 22a and 23a and drive fixed electrodes 22b and 23b shaped of comb teeth.

The base portions 22a and 23a extend in the y-axis direction. The base portions 22a and 23a are connected with a plurality of drive fixed electrodes 22b and 23b, respectively. The base portions 22a and 23a have bonding pads (unshown) connected to bonding wires via which AC voltage (drive voltage) added to DC voltage is applied from an outside. The desired AC voltage is applied to the base portions 22a and 23a, permitting the desired AC voltage to be applied to the respective drive fixed electrodes 22b and 23b.

The drive fixed electrodes 22b and 23b are shaped of comb teeth that are opposed to comb teeth of drive movable electrodes 31b, 32b, 33b, 34b included in the outer drive weights 31 and 32 and the inner drive weights 33 and 34, which are explained later. To be specific, the drive fixed electrodes 22b and 23b include a plurality of support portions 22c and 23c extending in the x-axis direction; and a plurality of comb-teeth shaped electrodes 22d and 23d extending in the y-axis direction from the respective support portions 22c and 23c. A plurality of such structural members are arranged to extend in the y-axis direction on both outer sides of the base portions 22a and 23a in the x-axis direction.

The detection fixed portions 24 and 25 are arranged inside of the detection weights 35 and 36 provided to the inner drive weights 33 and 34, which will be explained later. The detection fixed portions 24 and 25 include base portions 24a and 25a and detection fixed electrodes 24b and 25b.

The base portions 24a and 25a have bonding pads (unshown) that are connected to bonding wires, via which signals are outputted to an outside. The detection fixed electrodes 24b and 25b are a plurality of comb-teeth shaped electrodes that extend in the y-axis direction from the base portions 24a and 25a. The detection fixed electrodes 24b and 25b are opposed to respective comb teeth of the detection movable electrodes 35b and 36b shaped of comb teeth in the detection weights 35 and 36.

The movable portion 30 is a portion that is displaced depending on an application of angular velocity and includes the outer drive weights 31 and 32, the inner drive weights 33 and 34, and the detection weights 35 and 36. The movable portion 30 has a layout in which the outer drive weight 31, the inner drive weight 34 equipped with the detection weight 35, the inner drive weight 34 equipped with the detection weight 36, and the outer drive weight 32 are arranged in this order in the x-axis direction. That is, the detection weights 35 and 36 are arranged inside of the inner drive weights 33 and 34, respectively; the inner drive weights 33 and 34 are arranged side by side in inner sides of the movable portion 30; and two outer drive weights 31 and 32 are arranged in both the outer sides of the movable portion 30 so as to sandwich two inner drive weights 33 and 34 from both the outer sides.

The outer drive weights 31 and 32 include mass portions 31a and 32a and drive movable electrodes 31b and 32b.

The mass portions 31a and 32a extend in the y-axis direction. The mass portion 31a is arranged to be opposed to the base portion 22a of the drive fixed portion 22; the mass portion 32a is arranged to be opposed to the base portion 23a of the drive fixed portion 23. The mass portions 31a and 32a function as weights, permitting the outer drive weights 31 and 32 to move in the y-axis direction.

The drive movable electrodes 31b and 32b are comb-teeth shaped electrodes that are opposed to comb teeth of the drive fixed electrodes 22b and 23b. To be specific, the drive movable electrodes 31b and 32b include a plurality of support portions 31c and 32c extending in the x-axis direction; and a plurality of comb-teeth shaped electrodes 31d and 32d extending in the y-axis direction from the respective support portions 31c and 32c. A plurality of such structural members are arranged side by side in the y-axis direction on the side of the mass portions 31a and 32a facing the drive fixed portions 22 and 23.

The inner drive weights 33 and 34 include mass portions 33a and 34a and drive movable electrodes 33b and 34b.

The mass portions 33a and 34a are shaped of a rectangle frame. The mass portions 33a and 34a function as weights, permitting the inner drive weights 33 and 34 to move in the y-axis direction. Two opposite sides of the rectangle mass portions 33a and 34a are arranged to be parallel with the x-axis direction or the y-axis direction. One side of two opposite sides parallel with the y-axis direction is opposed to the base portions 22a and 23a of the drive fixed portions 22 and 23. To be specific, one side of two opposite sides parallel with the y-axis direction of the mass portions 33a and 34a is opposed to the base portions 22a and 23a of the drive fixed portions 22 and 23. Such one side opposed to the base portions 22a and 23a is provided with the drive movable electrodes 33b and 34b.

The drive movable electrodes 33b and 34b are comb-teeth shaped electrodes that are opposed to comb teeth of the drive fixed electrodes 22b and 23b. To be specific, the drive movable electrodes 33b and 34b include a plurality of support portions 33c and 34c extending in the x-axis direction; and a plurality of comb-teeth shaped electrodes 33d and 34d extending in the y-axis direction from the respective support portions 33c and 34c. A plurality of such structural members are arranged side by side in the y-axis direction on the side of the mass portions 33a and 34a facing the drive fixed portions 22 and 23.

The detection weights 35 and 36 include mass portions 35a and 36a and detection movable electrodes 35b and 36b.

The mass portions 35a and 36a are each shaped of a rectangle frame, and supported in inner wall faces of the inner drive weights 33 and 34 via the detection beams 41 of the beam portion 40 mentioned later. The detection weights 35 and 36 are moved in the y-axis direction along with the inner drive weights 33 and 34. The mass portions 35a and 36a function as weights, permitting the detection weights 35 and 36 to move also in the x-axis direction. The detection movable electrodes 35b and 36b are a plurality of comb-teeth shaped electrodes that extend in the y-axis direction from the mass portions 35a and 36a. The detection movable electrodes 35b and 36b are opposed to respective comb teeth of the detection fixed electrodes 24b and 25b shaped of comb teeth in the detection fixed portions 24 and 25.

The beam portion 40 includes detection beams 41, drive beams 42, and support members 43.

The detection beams 41 compose a second spring. The detection beams 41 connect sides of the inner drive weights 33 and 34 with sides of the detection weights 35 and 36. The sides of the inner drive weights 33 and 34 are parallel with the x-axis direction in the inner wall faces of the mass portions 33a and 34a. The sides of the detection weights 35 and 36 are parallel with the x-axis direction in the outer wall faces of the mass portions 35a and 36a. The detection beams 41 can be displaced in the x-axis direction; based on the displacement of the detection beams 41, the detection weights 35 and 36 are movable in the x-axis direction with respect to the inner drive weights 33 and 34.

The drive beams 42 connect the outer drive weights 31 and 32 with the inner drive weights 33 and 34 while permitting the movement of the outer drive weights 31 and 32 and the inner drive weights 33 and 34 in the y-axis direction. The drive beams 42 connect, with each other, one outer drive weight 31, one inner drive weight 33, the other inner drive weight 34, and the other outer drive weight 32, which are arranged in this order.

To be specific, the drive beams 42 are each a linear beam with a predetermined width in the y-axis direction. One drive beam 42 is arranged on each outer side of both the outer sides that sandwich the outer drive weights 31 and 32 and the inner drive weights 33 and 34 in the y-axis direction. The drive beams 42 are, respectively, connected to the outer drive weights 31 and 32 and the inner drive weights 33 and 34. The drive beams 42 may be connected directly to the outer drive weights 31 and 32 and the inner drive weights 33 and 34. However, for example, in the present embodiment, the drive beams 42 are connected with the inner drive weights 33 and 34 via connection portions 42a.

The support members 43 support the outer drive weights 31 and 32, the inner drive weights 33 and 34, and the detection weights 35 and 36. To be specific, the support members 43 are provided between the inner wall faces of the support fixed portion 21 and the drive beams 42, and support the above weights 31-36 in the support fixed portion 21 via the drive beams 42.

The support members 43 include rotation beams 43a, support beams 43b, and connection portions 43c. The rotation beams 43a are each a linear beam with a predetermined width in the y-axis direction. The support beams 43b are connected to both the outer ends of the rotation beam 43a; the connection portion 43c is connected to a central position of the rotation beam 43a on the side opposite to the side facing the support beams 43b. The rotation beam 43a bends to be lenticulated in an S character shape centering on the connection portion 43c during a sensor drive being performed. The support beams 43b compose a first spring, and connect both the outer ends of the rotation beam 43a to the support fixed portion 21. The support beams 43b are each provided as a linear member in the present embodiment. The support beams 43b also play a role to permit each of the weights 31-36 to move in the x-axis direction when an impact or the like is applied. The connection portions 43c play a role to connect the support members 43 to the drive beams 42.

The above structure composes an oscillatory type angular velocity sensor including a pair of angular velocity detection structures, which include two outer drive weights 31 and 32, two inner drive weights 33 and 34, and two detection weights 35 and 36, respectively. Further, the oscillatory type angular velocity sensor is to provide a shock resistant performance. Such an advantageous effect will be explained in detail subsequently.

Figure 2:
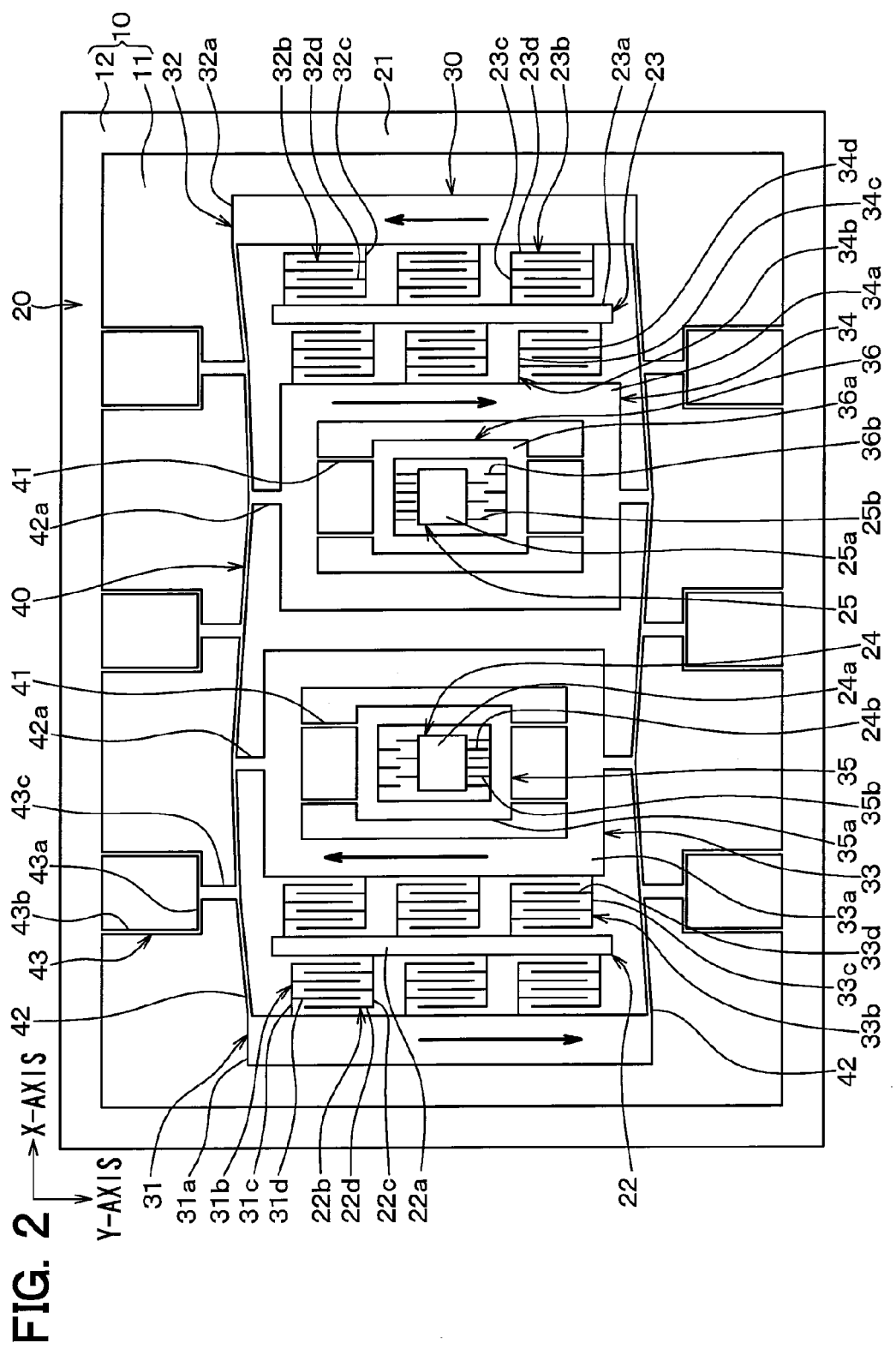
FIG. 2 is a schematic diagram illustrating a state in basic movement of the oscillatory type angular velocity sensor according to the embodiment of the present disclosure.
Figure 3:
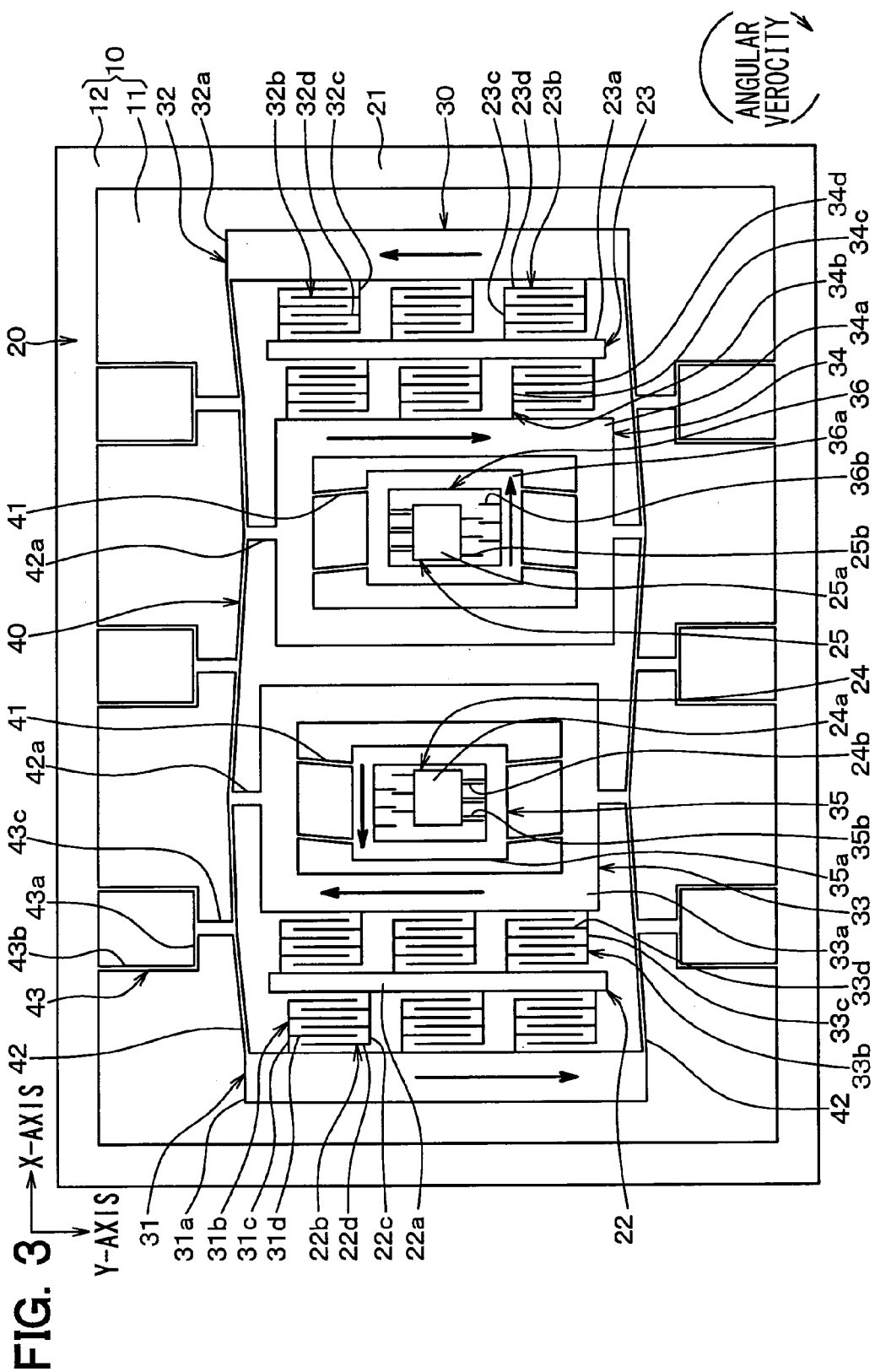
FIG. 3 is a schematic diagram illustrating a state where an angular velocity is applied to the oscillatory type angular velocity sensor according to the embodiment of the present disclosure.

The following will explain an operation of the oscillatory type angular velocity sensor mentioned above with reference to schematic diagrams in FIGS. 2 and 3 illustrating operating states.

First, a basic movement state of the oscillatory type angular velocity sensor will be explained with reference to FIG. 2. The AC voltage added to the DC voltage is applied to the drive fixed portions 22 and 23 to generate a potential difference between the outer drive weights 31 and 32 and the inner drive weights 33 and 34. Based on the potential difference, an electrostatic force occurs in the y-axis direction. This electrostatic force permits the respective drive weights 31-34 to vibrate in the y-axis direction. At this time, the vibration in the y-axis direction of each of the drive weights 31-34 is monitored while changing the frequency of the AC voltage, for adjustment to permit the frequency of AC voltage to turn into a drive resonance frequency fd. For example, an electrode for the monitor is provided so as to be arranged to be opposed to the outer drive weights 31 and 32, and detects displacements of the outer drive weights 31 and 32 based on the change in the capacitance formed among them. At this time, the drive resonance frequency fd is detected, through a circuit process, as the frequency taking place when the capacitance change is great. The drive resonance frequency fd is determined based on the structure of an oscillator such as a width of the drive beam 42. The drive resonance frequency fd is set to several kilohertz—several tens of kHz, in particular, to 5 kHz-10 kHz; this can achieve a high sensitivity in the oscillatory type angular velocity sensor.

At this time, as illustrated in FIG. 2, the outer drive weight 31 and the inner drive weight 33 vibrate in mutually opposite phases in the y-axis direction under the arrangement of the drive fixed electrodes 22b in the drive fixed portion 22, the drive movable electrodes 31b in the outer drive weight 31, and the drive movable electrodes 33b in the inner drive weight 33. Further, the outer drive weight 32 and the inner drive weight 34 vibrate in mutually opposite phases in the y-axis direction under the arrangement of the drive fixed electrodes 23b in the drive fixed portion 23, the drive movable electrodes 32b in the outer drive weight 32, and the drive movable electrodes 34b in the inner drive weight 34. Furthermore, two inner drive weights 33 and 34 vibrate in mutually opposite phases in the y-axis direction. This drives the oscillatory type angular velocity sensor in a drive mode shape.

It is noted that at this time the drive beams 42 are lenticulated in an S character shape, permitting the movement in the y-axis direction of each of the weights 31-34. In contrast, at this time, the connection portions 43c connecting the rotation beams 43a with the drive beams 42 are each structured to be a node (fixed point) in the amplitude and be maintained hardly displaced.

Next, a state of the oscillatory type angular velocity sensor when an angular velocity is applied will be explained with reference to FIG. 3. When during a basic movement illustrated in FIG. 2, an angular velocity about the z-axis direction is applied to the oscillatory type angular velocity sensor, the detection weights 35 and 36 are displaced in the x-axis direction due to Coriolis force, as indicated in FIG. 3. Such displacement changes a capacitance value of a capacitor by the detection movable electrode 35b of the detection weight 35 and the detection fixed electrode 24b of the detection fixed portion 24, and a capacitance value of a capacitor by the detection movable electrode 36b of the detection weight 36 and the detection fixed electrode 25b of the detection fixed portion 25.

Thus, an angular velocity can be detected by reading the change in the capacitance values of the capacitors based on output signals from the bonding pads of the detection fixed portions 24 and 25. For example, the present embodiment enables reading of the change in the capacitance values of the capacitors by applying differential amplification to the signals taken out from two respective angular velocity detection structures, thereby detecting the angular velocity more accurately. Thus, the applied angular velocity can be detected by the oscillatory type angular velocity sensor according to the present embodiment.

The oscillatory type angular velocity sensor according to the present embodiment has the frequencies f1 and f3 of two resonance modes against application of impacts. To be specific, FIG. 4 (b) schematically indicates the resonance frequency f1 in same-phase mode where two weights m1 and m2 supported by the springs s1 and s2 swing in the same direction. In contrast, FIG. 4 (c) schematically indicates the resonance frequency f3 in same-phase absorptive mode where two weights m1 and m2 supported by the springs s1 and s2 swing in the mutually opposite directions. The resonance frequency f3 in the same-phase absorptive mode is greater than the resonance frequency f1 in the same-phase mode. It is noted that FIG. 4 (a) indicates a stationary state of the weights m1 and m2 supported by the springs s1 and s2.

Figure 4:
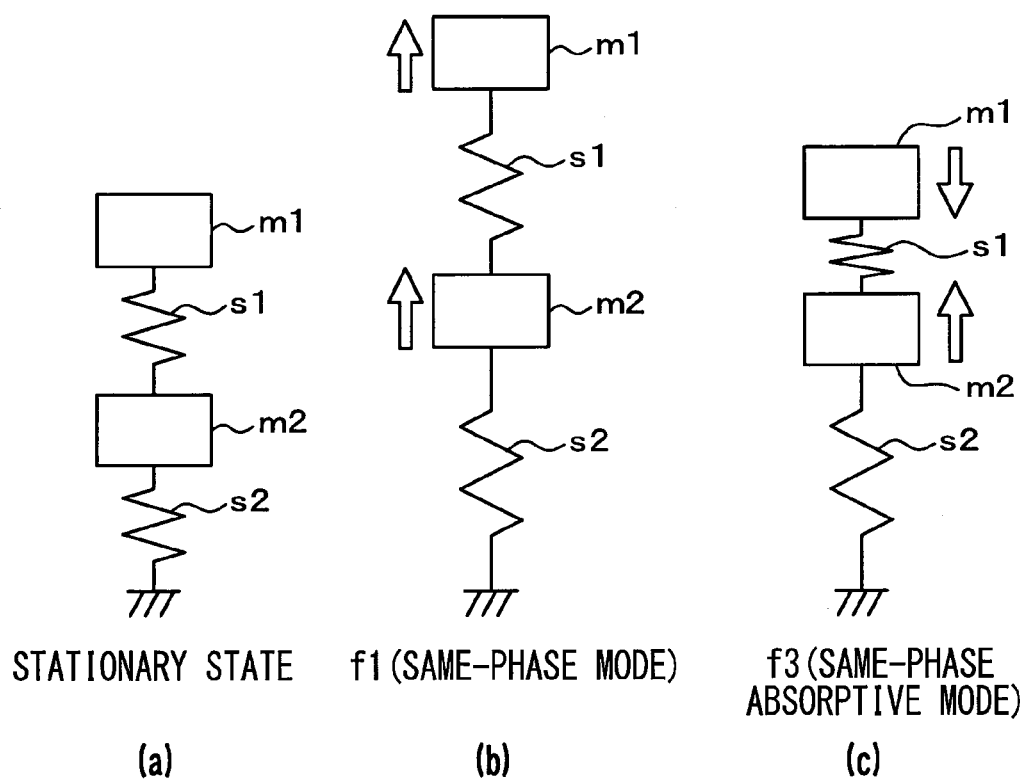
FIG. 4 are diagrams: (a) is a schematic diagram illustrating a stationary state of two weights supported by springs, (b) is a schematic diagram illustrating a movement in same-phase mode compared with the stationary state, and (c) is a schematic diagram illustrating a movement in same-phase absorptive mode compared with the stationary state.
Figure 5:
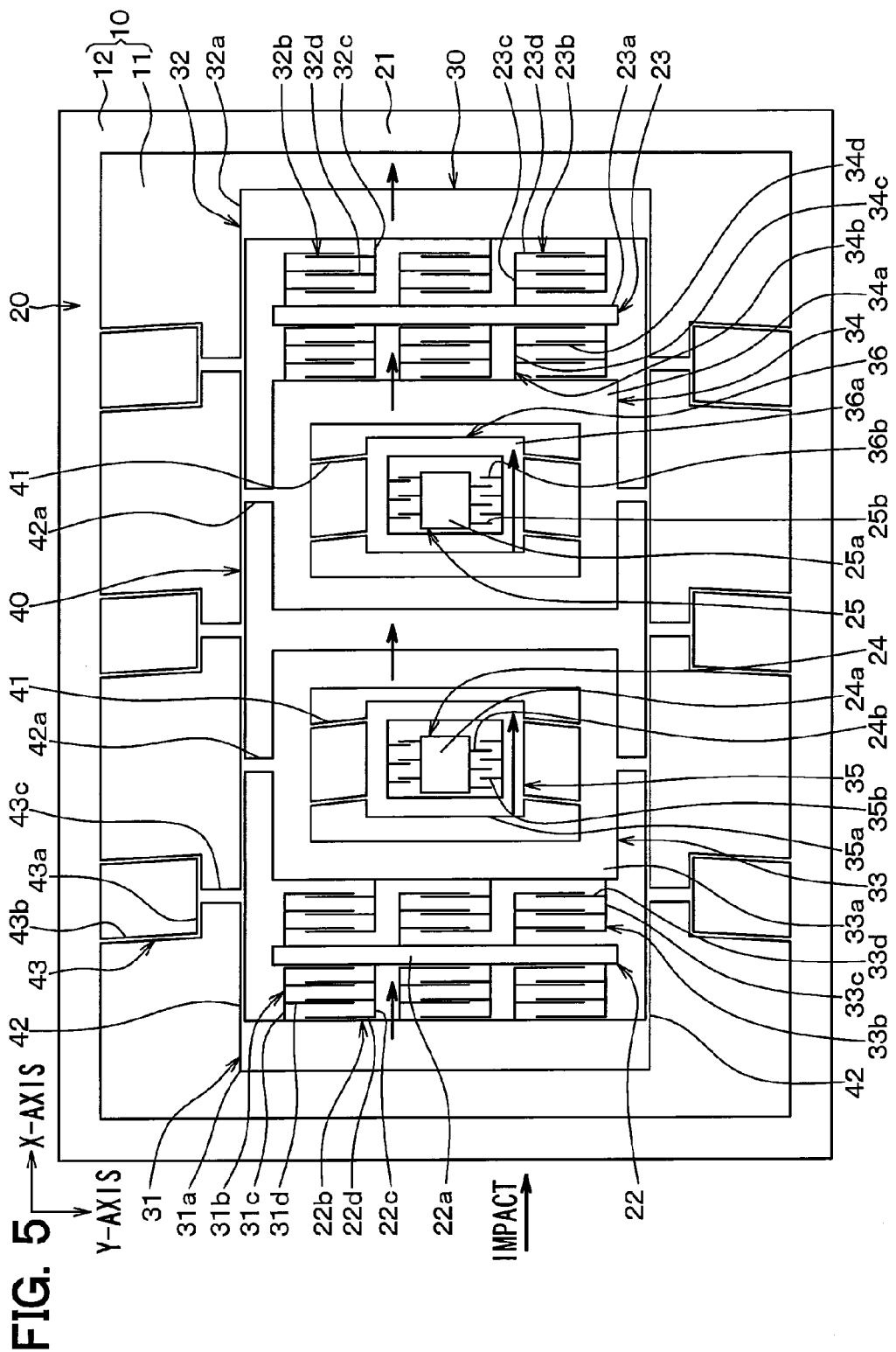
FIG. 5 is a schematic diagram illustrating a movement in same-phase mode when an impact is applied to the oscillatory type angular velocity sensor according to the embodiment of the present disclosure from the left direction on the drawing.
Figure 6:
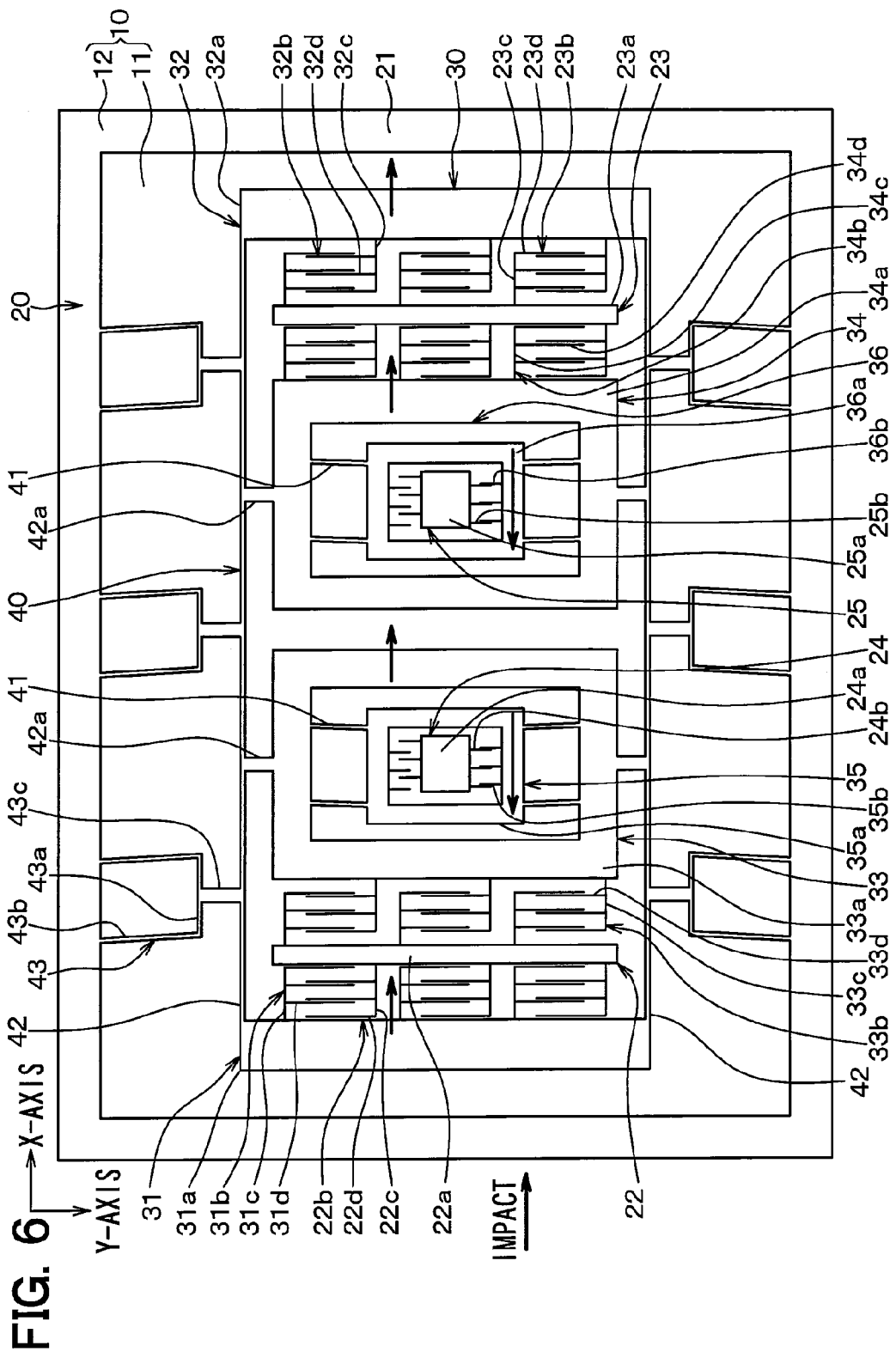
FIG. 6 is a schematic view illustrating a movement in same-phase absorptive mode when an impact is applied to the oscillatory type angular velocity sensor according to the embodiment of the present disclosure from the left direction on the drawing.

The schematic diagrams of FIG. 4 (a)-(c) are used for simply explaining the movement of the weights m1 and m2 in the same-phase mode and the same-phase absorptive mode. The oscillatory type angular velocity sensor according to the present embodiment exhibits the movements illustrated in FIG. 5 and FIG. 6. With reference to FIG. 5, when an impact is applied to the oscillatory type angular velocity sensor from the left direction on the drawing, the inner drive weights 33 and 34 and the detection weights 35 and 36 swing to the same direction in the x-axis direction at the resonance frequency f1 in the same-phase mode. Further, with reference to FIG. 6, when an impact is applied to the oscillatory type angular velocity sensor from the left direction on the drawing, the inner drive weights 33 and 34 and the detection weights 35 and 36 swing to the opposite directions in the x-axis direction at the resonance frequency f3 in the same-phase absorptive mode.

The position relation at a resonance frequency is not taken into consideration in a physical quantity sensor designed simply, and an integral multiple of the resonance frequency f1 (n times the resonance frequency f1 (n is an integer that is equal to or greater than one)) is located near the resonance frequency f3 in many cases. Therefore, when an excessive impact is applied, the swing at the resonance frequency f1 in the same-phase mode and the swing at the resonance frequency f3 in the same-phase absorptive mode interfere with each other; this may cause a displacement greater than an estimation. As a result, each comb tooth of the detection movable electrodes 35b and 36b of the detection weights 35 and 36 may contact the detection fixed electrodes 24b and 25b of the detection fixed portions 24 and 25, causing a sensor erroneous output.

Applying an impact to the oscillatory type angular velocity sensor produces a displacement mechanism that the drive weights 31-34 and the detection weights 35 and 36 are displaced by the addition of the following three excitations: (1) vibrational excitation by dissonance; (2) vibrational excitation by resonance; and (3) vibrational excitation by resonance interference. That is, the vibrational excitations (1)-(3) arise so as to be added up at the same time, thereby displacing the drive weights 31-34 and the detection weights 35 and 36.

Figure 7:
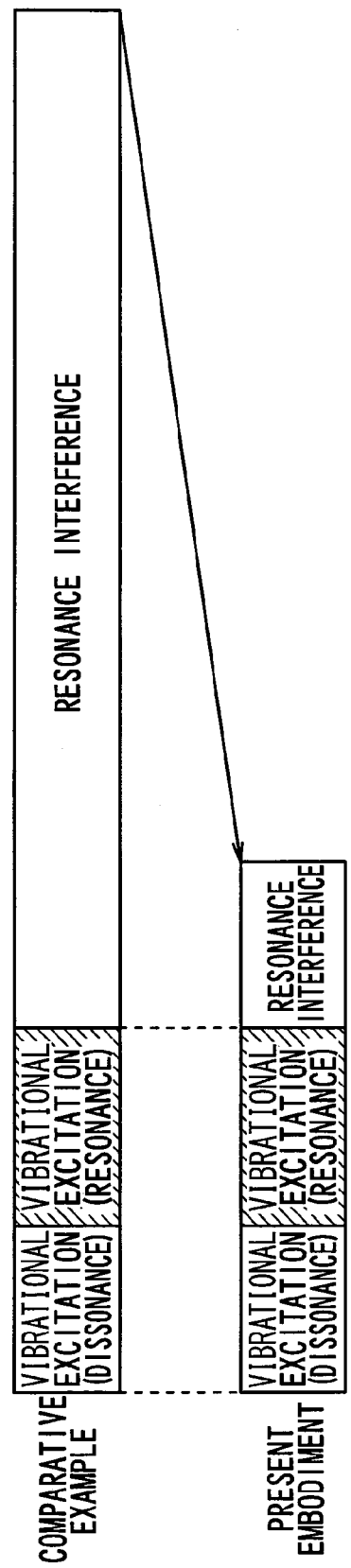
FIG. 7 is a diagram illustrating a result of investigating respective vibrational excitations.

The vibrational excitation (1) by dissonance is a displacement quantity simply calculated from an inertia force and a spring force. The vibrational excitation (2) by resonance is an excitation quantity calculated from Q factor (peak value of resonance power) specific to an oscillator and an application time period of an impact component having the same frequency as that in a resonance mode, mainly, the resonance frequency f1 in the same-phase mode. The vibrational excitation (3) by resonance interference is an excitation quantity by interference at (i) an integral multiple of the resonance frequency f1 (n times the resonance frequency f1 (n is an integer that is equal to or greater than one)) in the same-phase mode and (ii) the resonance frequency f3 in the same-phase absorptive mode. The investigation of the vibrational excitations (1)-(3) provides a result in FIG. 7. In a comparative example, the position relation in resonance frequencies is not considered and an integral multiple of the resonance frequency f1 (n times the resonance frequency f1 (n is an integer that is equal to or greater than one)) in the same-phase mode is near the resonance frequency f3 in the same-phase absorptive mode. In such a comparative example, the contribution of the vibrational excitation (3) by resonance interference is significantly great. That is, the comparative example does not consider an influence due to the vibrational excitation (3) by resonance interference and does not take a measure to reduce an vibrational excitation. Instead, the comparative example takes a measure for providing a vibration proof member so as not to transmit an impact to a sensor or for increasing an interval between movable electrodes and fixed electrodes. However, if the vibrational excitation (3) by resonance interference is reduced, the contribution of the vibration excitation (3) can be reduced among all the vibrational excitations, improving a shock resistant performance.

Herein, the affecting degree of the vibrational excitation (3) by resonance interference is equivalent to an amplification factor A, which is expressed by an expression 1 below. This expression 1 signifies that the vibrational excitation (3) by resonance interference is varied A times a level that is sufficiently reduced to be equivalent to the level of the vibrational excitation (1) by dissonance or the level of the vibrational excitation (2) by resonance.

$$A = \frac{1}{\sqrt{\left\{1 - \left(\frac{n \cdot f1}{f3}\right)^2\right\}^2 + \left(\frac{n \cdot f1}{f3 \cdot Q}\right)^2}} \quad \text{[EXPRESSSION 1]}$$

It is noted that in the expression 1, f1 is a resonance frequency in the same-phase mode; f3 is a resonance frequency in the same-phase absorptive mode; n is an integer that is equal to or greater than one; and Q is a Q factor.

Figure 8:
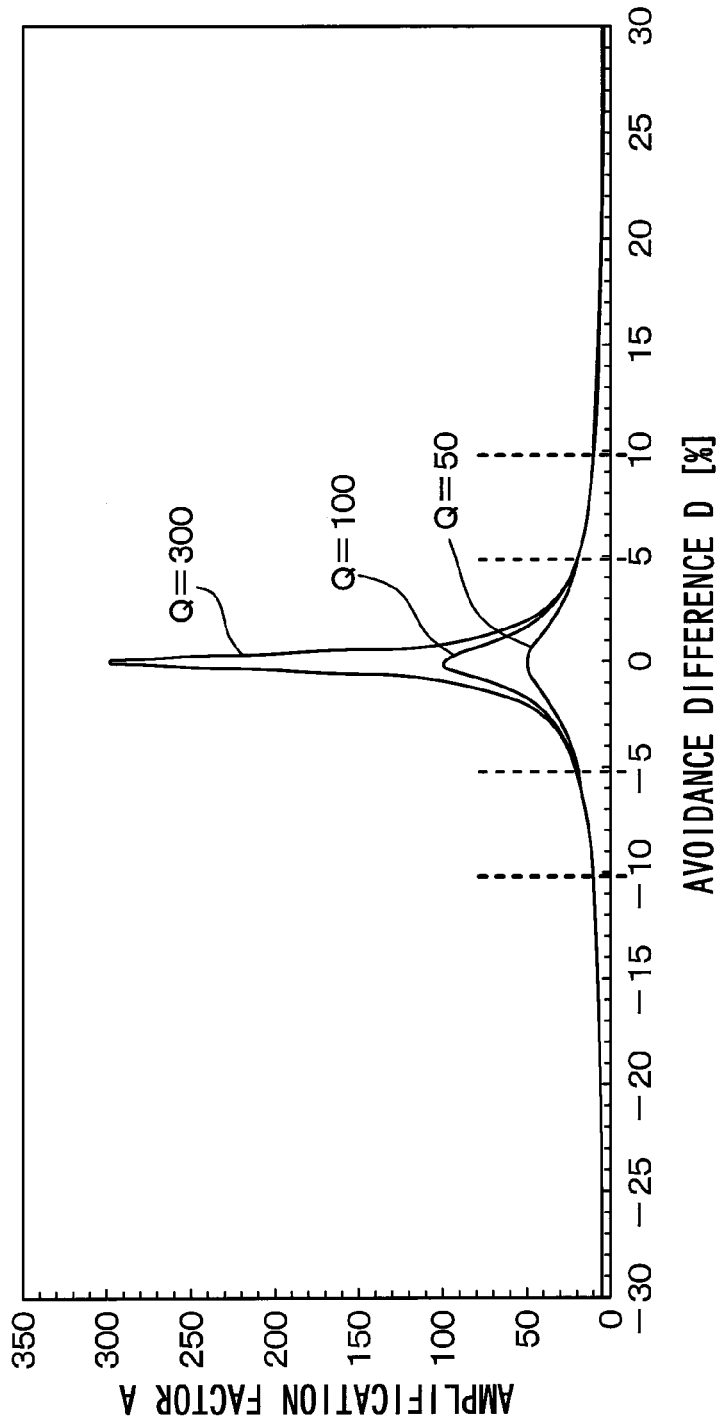
FIG. 8 is a graph illustrating expression 1 when Q factor is changed.

In addition, FIG. 8 is a graph of the expression 1 when Q factor is changed. An avoidance difference D, which is expressed by $D=\Delta f3/(n \cdot f1)=|f3-n \cdot f1|/(n \cdot f1)$, in FIG. 8 indicates a degree of deviation of an absolute value $\Delta f3$ from the resonance frequency f1 in the same-phase mode. The absolute value $\Delta f3$ is a difference between (i) the resonance frequency f3 in the same-phase absorptive mode and (ii) a value that is n times the resonance frequency f1 in the same-phase mode. Note that for easy understanding, D is indicated as %; thus, when D=0.10, D is indicated as 10%. As indicated in FIG. 8, the amplification factor A exhibits the greatest value at the avoidance difference D=0%, i.e., when the absolute value $\Delta f3$ accords with the resonance frequency f1 in the same-phase mode. At this point, the vibrational excitation (3) by resonance interference exhibits a greatest peak value and the contribution of the vibrational excitation (3) becomes high among all the vibrational excitations.

Therefore, the absolute value $\Delta f3$ (=|f3−n·f1|) may be designed so as not to accord with the resonance frequency f1 in the same-phase mode; this permits the vibrational excitation (3) by resonance interference not to exhibit the greatest peak value while reducing the contribution of the vibrational excitation (3) among all the vibrational excitations. That is, under the relation ($\Delta f3 > n \cdot f1 \cdot D$), the avoidance difference D needs to be at least not 0% (D≠0) and needs to be greater than 0%. This can prevent the vibrational excitation (3) by resonance interference from exhibiting the maximum displacement.

Further, if the avoidance difference D is designed to be greater than 5% (D>5%), the first term becomes sufficiently greater than the second term in the square roots in the denominator in the expression 1 and the amplification factor A is determined irrespective of Q factor included in the second term. To be specific, as illustrated in FIG. 8, the amplification factor A falls to about 20. Thus, designing the avoidance difference D to be greater than 5% can determine the amplification factor A irrespective of the Q factor and permit the amplification factor A to be sufficiently small, enabling an improvement in robustness.

Further, if the avoidance difference D is designed to be greater than 10% (D>10%), the amplification factor A falls to a single-digit value as illustrated in FIG. 8. This can suppress the vibrational excitation (3) by resonance interference to a sufficiently reduced state equivalent to that of the vibrational excitation (1) by dissonance or that of the vibrational excitation due (2) by resonance.

FIG. 8 illustrates the case where Q factor is varied in a range of 50 to 300. However, Q factor need not be limited to the above range.

Based on the above founding, the present embodiment designs a resonance frequency f1 in same-phase mode and a resonance frequency f3 in same-phase absorptive mode being greater than the resonance frequency f1 such that the following condition is satisfied by an absolute value $\Delta f3$ that is a difference between (i) the resonance frequency f3 in the same-phase absorptive mode and a value that is the product of n and the resonance frequency f1 in the same-phase mode. That is, a relation ($\Delta f3 > n \cdot f1 \cdot D$) is maintained and, simultaneously, the avoidance difference D is designed to be greater than 0%. This can prevent the vibrational excitation (3) by resonance interference from exhibiting the maximum displacement.

Preferably designing the avoidance difference D to be greater than 5% enables the reduction of the amplification factor A irrespective of Q factor, improving the robustness. More preferably designing the avoidance difference D to be greater than 10% enables the amplification factor A to reduce to a single-digit value; this can suppress the vibrational excitation (3) by resonance interference to a sufficiently reduced state equivalent to that of the vibrational excitation (1) by dissonance or that of the vibrational excitation (2) by resonance.

Thus, the resonance frequency f1 in the same-phase mode and the resonance frequency f3 in the same-phase absorptive mode are designed to satisfy the above relation, so that the vibrational excitation (3) by resonance interference is reduced. This can improve the shock resistant performance without using a vibration proof member, and without causing the decline in the sensor sensitivity.

Further, as indicated in the expression 1, the amplification factor A is defined by Q factor, an integral multiple of the resonance frequency f1 (n times the resonance frequency f1 (n is an integer that is equal to or greater than one)) in the same-phase mode, and the resonance frequency f3 in the same-phase absorptive mode. The amplification factor A can be reduced also by reducing Q factor in the expression 1 as compared with a conventional one. For example, the oscillatory type angular velocity sensor according to the present embodiment is under a state of vacuum lock; reducing the degree of vacuum can reduce Q factor. For example, when the degree of vacuum is reduced from about 100 pa (conventional) to about 300 pa, it is confirmed that Q factor is reduced to one third (⅓). Thus, reducing Q factor compared with a conventional one results in reducing the amplification factor A, further reducing the vibrational excitation (3) by resonance interference. In addition, reducing Q factor results in also reducing the vibrational excitation (2) by resonance, in addition to reducing the vibrational excitation (3) by resonance interference; this enables an improvement in a shock resistant performance.

Other Embodiments

The above embodiment explains the case where the substrate 10 uses an SOI substrate. However, this is only an example of the substrate 10. The substrate 10 may use other than an SOI substrate.

The present disclosure need not be limited to a pair of angular detection structures that include two outer drive weights 31 and 32, two inner drive weights 33 and 34, and two detection weights 35 and 36. Without need to be limited thereto, the present disclosure may be applied to more than one pair of angular detection structures.

Furthermore, although an angular velocity sensor is used for explanation as an example of a physical quantity sensor, the present disclosure may be applied to other physical quantity sensor such as an acceleration sensor.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. An oscillatory type angular velocity sensor applying a physical quantity sensor to angular velocity detection, the physical quantity sensor including:
   a substrate;
   a drive weight supported by the substrate via a first spring;
   a detection weight supported by the drive weight via a second spring, the detection weight including a detection movable electrode; and
   a detection fixed portion including a detection fixed electrode that is arranged to be opposed to the detection movable electrode, wherein:
   an application of a physical quantity, while the drive weight is driven and vibrated, displaces the detection movable electrode and the detection weight to change an interval between the detection movable electrode and the detection fixed electrode;
   the physical quantity is detected based on the changed interval;
   f1 is defined as a resonance frequency in same-phase mode where the drive weight moves following the application of the physical quantity in a direction identical to a direction in which the detection weight moves;
   f3 is defined as a resonance frequency in same-phase absorptive mode where the drive weight moves following the application of the physical quantity in a direction opposite to a direction in which the detection weight moves;
   n is defined as an integer that is equal to or greater than one;
   the resonance frequency f3 in the same-phase absorptive mode is greater than the resonance frequency f1 in the same-phase mode;
   $\Delta f3$, which is expressed by $\Delta f3 = |f3 - n \cdot f1|$, is defined as an absolute value that is a difference between the resonance frequency f3 in the same-phase absorptive mode and a value that is a product of the resonance frequency f1 in the same-phase mode multiplied by n;
   D, which is expressed by $D = \Delta f3/(n \cdot f1) = |f3 - n \cdot f1|/(n \cdot f1)$, is defined as an avoidance difference that indicates a degree of deviation of the absolute value $\Delta f3$ from the resonance frequency f1 in the same-phase mode; and
   a relation, which is expressed by $\Delta f3 > n \cdot f1 \cdot D$, is satisfied and, simultaneously, the avoidance difference D is provided to be greater than 0.00,
   the drive weight of the physical quantity sensor being provided as a pair of inner drive weights,
   the inner drive weights surrounding the detection weight, the inner drive weights being connected to the detection weight via detection beams corresponding to the second spring,
   the oscillatory type angular velocity sensor comprising:
   a pair of outer drive weights located at both outer sides that sandwich the pair of inner drive weights; and a drive fixed portion to generate electrostatic attraction that vibrates the inner drive weights and the outer drive weights in mutually opposite directions, wherein the inner drive weights are connected to the outer drive weights by drive beams while the outer drive weights and the inner drive weights connected to the detection weight are supported to the substrate by support members that include the first spring, wherein:

the drive beams are bent based on the electrostatic attraction generated by the drive fixed portion to perform a sensor drive that vibrates the outer drive weights and the inner drive weights;

when an angular velocity is applied as the physical quantity during the sensor drive being performed, the detection beams are bent so that the detection weight is moved in a direction orthogonal to an oscillating direction of the inner drive weights to change a capacitance between the detection fixed electrode and the detection movable electrode; and the angular velocity is detected base on the changed capacitance.

2. The oscillatory type angular velocity sensor according to claim 1, wherein
in the physical quantity sensor, the avoidance difference D is provided to be equal to or greater than 0.05.

3. The oscillatory type angular velocity sensor according to claim 1, wherein
in the physical quantity sensor, the avoidance difference D is provided to be equal to or greater than 0.10.

* * * * *